C. URBANSKI.
PUMP AND SUPPORT THEREFOR.
APPLICATION FILED JUNE 17, 1914.
1,195,878.
Patented Aug. 22, 1916.
2 SHEETS—SHEET 1.
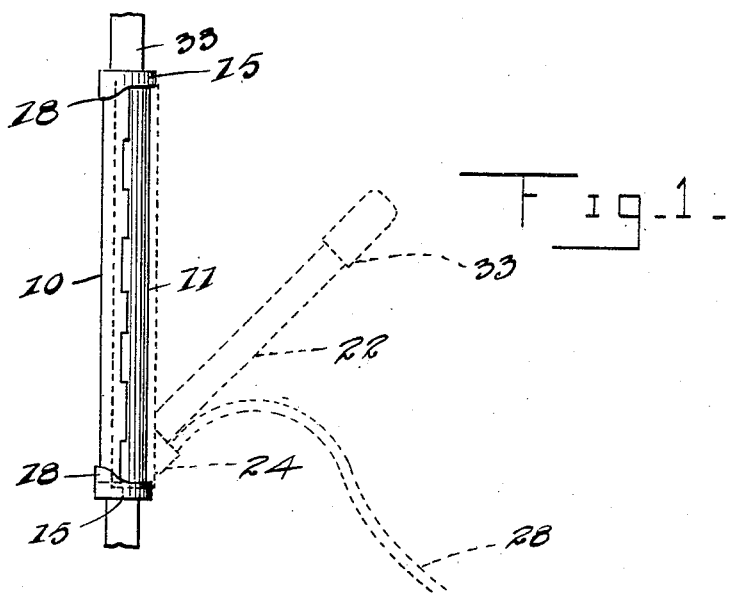
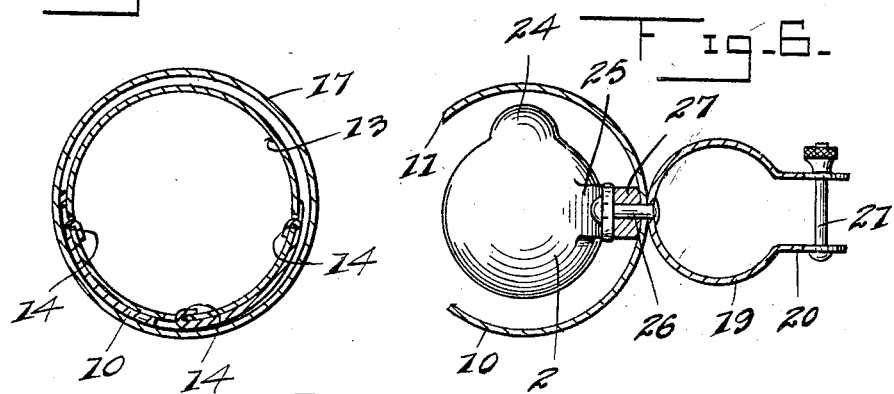
Witnesses
Inventor
C. Urbanski.

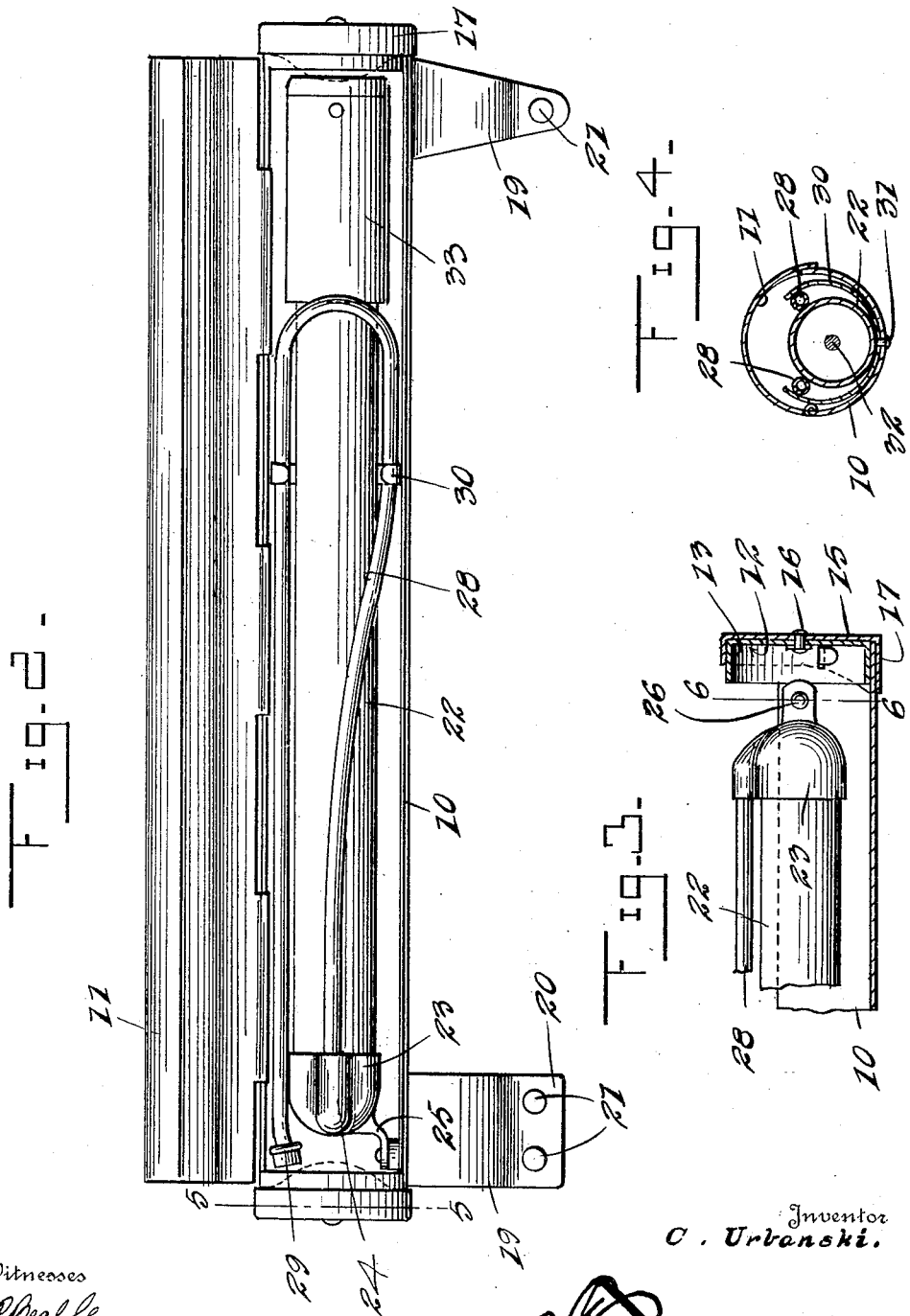

UNITED STATES PATENT OFFICE.

CZESLAW URBANSKI, OF BUFFALO, NEW YORK.

PUMP AND SUPPORT THEREFOR.

1,195,878.  Specification of Letters Patent.  Patented Aug. 22, 1916.

Application filed June 17, 1914. Serial No. 845,626.

*To all whom it may concern:*

Be it known that I, CZESLAW URBANSKI, a citizen of the United States, residing at Buffalo, in the county of Erie and State of New York, have invented certain new and useful Improvements in Pumps and Supports Therefor; and I do hereby declare the following to be a full, clear, and exact description of the invention, such as will enable others skilled in the art to which it appertains to make and use the same.

This invention relates to pumps, and has for its object to provide a device of this character especially designed for attachment to bicycles and motorcycles for inflating the pneumatic tires thereof.

Another and more specific object is the provision of a casing attachable to the frame of the bicycle and pivotally supporting the pump, whereby the latter may be swung to operative position and operated while attached to and supported by the vehicle.

Another object is the provision of a novel and efficient housing or casing for supporting and protecting the pump when not in use.

With these and other objects in view, the invention consists in the novel construction, arrangement and formation of parts as will be hereinafter specifically described, claimed and illustrated in the accompanying drawings, in which:

Figure 1 represents a side view of the pump casing attached to a bicycle. Fig. 2 represents an enlarged side elevation of the casing, showing the cover thereof open and the pump arranged therein. Fig. 3 represents an enlarged detail sectional view, partly broken away, of the connection between the pump and casing. Fig. 4 represents a transverse sectional view of the casing and pump. Fig. 5 represents a transverse sectional view on the line 5—5 of Fig. 2. Fig. 6 represents a transverse sectional view on the line 6—6 of Fig. 3. Fig. 7 represents a perspective view of the cover locking member detached from the casing.

Referring to the drawing in detail, wherein similar reference numerals indicate corresponding parts throughout the several views, the numeral 10 designates the body of the casing to one edge of which is hingedly secured the cover 11 and the body 10 and cover 11 are so curved as to provide a cylindrical casing or housing when the cover is closed. End walls 12 are provided with inwardly directed flanges 13 having recesses therein to receive the tongues 14 carried by the opposite extremities of the body 10 of the casing. Circular securing members 15 are pivotally secured to the end walls 12 by rivets or the like 16 and are provided with inwardly directed flanges 17 telescoping to the inwardly directed flange 13 of the wall 12. The flanges 17 are formed with enlargements 18 adapted, when the members 15 are rotated to engage the outer face of the hinged cover 11, as illustrated in Fig. 1 to lock the cover in closed position. Brackets 19 are secured to the body 10 and provided with parallel ends 20 through which are engaged the bolts 21 whereby the casing is secured on the frame of the bicycle or motorcycle.

The cylinder 22 of the pump is provided with a head 23 having a lateral enlargement 24 provided with a bore communicating with the interior of the cylinder 23. An angular extension 25 is formed on the head 23 and is pivotally secured in the lower end of the body 10 on a rivet or bolt 26 and is normally retained in spaced relation to said body 10 by a suitable spacing element 27. The bolt or rivet 26 constitutes a pivot whereby the upper extremity of the pump cylinder may be swung outwardly in convenient position for use. A flexible tube 28 is secured to the lateral enlargement of the head 24 and is provided at its free extremity with the usual rotatable threaded sleeve 29, whereby the hose is attached to the tire. A curved spring 30 is secured at 31 in the casing body 10 and the free extremities thereof project beyond the longitudinal edges of said body for securing the pump cylinder 22 and the flexible tube 28 from loose movement in the casing. The usual piston is slidably mounted in the cylinder 22 and is provided with a rod 32 carrying at its outer extremity a suitable handle 33 whereby the pump is manually operated.

In use, the casing is preferably secured to the frame of a bicycle or motorcycle to one of the vertical bars thereof underneath the seat, as illustrated in Fig. 1. In its normal position, the pump 22 and the tube 28 are positioned within the casing, and the cover 11 thereof is locked in closed position by the extensions 18 and the rotatable locking members 15. When desired, the members 15 are rotated and the cover 11 is swung to open position. The cylinder 22 is swung outwardly on its pivot 26 and the sleeve 29 of the tube 28 is secured to the tire to be inflated and the handle 33 operated to pump the tire. When sufficient air has been pumped into the tire, the cylinder 22 and tube 28 are brought inwardly within the body 10 of the casing, as clearly illustrated in Fig. 2, and the cover 11 closed and locked.

What I claim is:

In combination, a casing including a body and a cover hinged thereto, means for securing said cover in closed position, means independent of said cover for securing said body to the frame of a vehicle, a pump, a longitudinal extension on said pump, means pivotally securing said extension to said casing whereby said pump may be swung outwardly into operative position for use, a flexible tube secured to said pump, and a spring secured in said body for securing said pump and tube in position.

In testimony whereof I affix my signature in presence of two witnesses.

CZESLAW URBANSKI.

Witnesses:
 JOHN URBANSKI,
 STANLEY URBANSKI.

Copies of this patent may be obtained for five cents each, by addressing the "Commissioner of Patents, Washington, D. C."